United States Patent
Goyal et al.

(10) Patent No.: US 9,767,465 B2
(45) Date of Patent: Sep. 19, 2017

(54) METHODS AND SYSTEMS FOR FACILITATING CACHING OF ADVERTISEMENTS

(75) Inventors: Prabhakar Goyal, Sunnyvale, CA (US); Sanjay Kumar Gupta, Sunnyvale, CA (US); Rampradeep Dodda, Santa Clara, CA (US)

(73) Assignee: Excalibur IP, LLC, New York, NY (US)

( * ) Notice: Subject to any disclaimer, the term of this patent is extended or adjusted under 35 U.S.C. 154(b) by 473 days.

(21) Appl. No.: 13/284,129

(22) Filed: Oct. 28, 2011

(65) Prior Publication Data

US 2013/0110643 A1 May 2, 2013

(51) Int. Cl.
*G06Q 30/02* (2012.01)
*G06F 9/30* (2006.01)

(52) U.S. Cl.
CPC .................. *G06Q 30/02* (2013.01)

(58) Field of Classification Search
USPC ....................................... 705/14.4
See application file for complete search history.

(56) References Cited

U.S. PATENT DOCUMENTS

| | | |
|---|---|---|
| 6,379,251 B1 | 4/2002 | Auxier et al. |
| 6,393,158 B1 | 5/2002 | Gould et al. |
| 6,621,980 B1 | 9/2003 | Gould et al. |
| 6,826,614 B1 * | 11/2004 | Hanmann ......... G06F 17/30902 707/E17.12 |
| 7,117,506 B2 | 10/2006 | de Bonet | 
| 7,937,405 B2 | 5/2011 | Anderson et al. |
| 8,027,961 B2 | 9/2011 | Cooper |
| 8,135,626 B2 * | 3/2012 | Das .................. G06Q 30/02 705/14.4 |
| 8,504,437 B1 * | 8/2013 | Agarwal ............ G06F 17/30 705/14.54 |

(Continued)

FOREIGN PATENT DOCUMENTS

KR 10-2002-0038137 A 5/2002

OTHER PUBLICATIONS

PCT International Search Report and Written Opinion of the International Searching Authority (ISA) issued in International Application No. PCT/US2012/045846, Korean Intellectual Property Office, Aug. 27, 2013.

*Primary Examiner* — William A Brandenburg
(74) *Attorney, Agent, or Firm* — Martine Penilla Group, LLP (57) ABSTRACT

Methods and Systems for facilitating caching of advertisements are described. The methods include receiving an ad request and generating a serving plan in response to said receiving the ad request. The serving plan includes multiple cache lines that identify corresponding advertisements. Each of the cache lines is associated with a corresponding expiration. Also, each cache line is readable by logic to display one of the advertisements corresponding to the cache line. The cache lines include a first cache line. The first cache line includes ad information, which is associated with a first one of the advertisements. Moreover, the ad information includes one or more parameters for expiration of the first cache line of a client device. The client device is configured to display the plurality of advertisements. The method includes sending the serving plan to the client device to store in the client device.

20 Claims, 8 Drawing Sheets

(56) References Cited

U.S. PATENT DOCUMENTS

| | | | |
|---|---|---|---|
| 2002/0077909 A1* | 6/2002 | Kanojia | G06Q 30/02 705/14.61 |
| 2003/0046365 A1* | 3/2003 | Pfister | G06F 17/30902 709/219 |
| 2004/0167928 A1* | 8/2004 | Anderson | G06Q 30/02 |
| 2004/0243623 A1 | 12/2004 | Ozer et al. | |
| 2006/0282316 A1* | 12/2006 | Snyder | G06Q 30/0267 705/14.64 |
| 2006/0287920 A1* | 12/2006 | Perkins | G06Q 30/0251 705/14.49 |
| 2007/0027765 A1 | 2/2007 | Collins et al. | |
| 2007/0028263 A1* | 2/2007 | Collins | G06F 17/2785 725/34 |
| 2008/0034031 A1* | 2/2008 | Weisbrot | G06F 17/30902 709/203 |
| 2009/0041036 A1* | 2/2009 | Batz | H04L 67/2828 370/401 |
| 2009/0055256 A1* | 2/2009 | Donahue | G06Q 30/02 705/14.69 |
| 2009/0125585 A1* | 5/2009 | Krishnaswamy | G06Q 30/02 709/203 |
| 2009/0157834 A1* | 6/2009 | Krishnaswamy | G06Q 10/10 709/206 |
| 2010/0082527 A1 | 4/2010 | Jain | |
| 2010/0094703 A1 | 4/2010 | Bramley et al. | |
| 2010/0125491 A1 | 5/2010 | Elliott et al. | |
| 2010/0332328 A1* | 12/2010 | Dharmaji | G06Q 30/02 705/14.64 |
| 2011/0035259 A1* | 2/2011 | Das | G06Q 30/02 705/14.41 |
| 2011/0055002 A1* | 3/2011 | Donahue | G06Q 30/02 705/14.43 |
| 2011/0167486 A1* | 7/2011 | Ayloo | G06Q 10/00 726/7 |
| 2011/0238466 A1* | 9/2011 | Haumont | G06Q 30/02 705/14.4 |
| 2011/0258529 A1* | 10/2011 | Doig | G06Q 30/02 715/234 |
| 2013/0204696 A1* | 8/2013 | Krassner | G06Q 30/02 705/14.45 |

* cited by examiner

METHODS AND SYSTEMS FOR FACILITATING CACHING OF ADVERTISEMENTS

TECHNICAL FIELD

The present disclosure relates generally to methods and systems for facilitating caching of advertisements.

BACKGROUND

The rapidly expanding presence of the Internet has produced an increased recognition of the importance of web advertising. As compared to more traditional media such as television or radio, advertising on the Web is based on web page views and is more easily quantifiable. In large part, each page view represents a transaction between a client (or user's) computer and a web server. These individual client-server interactions permit more deterministic measures of the reach of particular advertising campaigns. Accordingly, it is important that communication between a client and a server is maintained at all times.

However, sometimes, communication is lost as a result of a variety of conditions, such as operation of the client at a location where signal strength is zero, damage to the server, or damage to a communication link between the client and the server. Moreover, although there is communication between the client and the server, advertisements can consume a large amount of network bandwidth.

It is in this content that various embodiments of the present invention arise.

SUMMARY

The following detailed description together with the accompanying drawings will provide a better understanding of the nature and advantages of various embodiments of the present invention.

In one embodiment, a client sends an ad request to an ad server. The ad server receives the ad request to generate a serving plan. The serving plan is a plan to serve a number of advertisements for a number of expiration time periods, which are indicated in the serving plan. The ad server receives the serving plan and executes one or more cache lines in the serving plan to retrieve one or more ad media packages locally, such as from the client device, or from an origin server. The one or more ad media packages are provided to a renderer that renders the one or more ad media packages. One or more advertisements are generated upon rendering the one or more corresponding ad media packages and are displayed on the client device. If communication is lost or is intermittently lost between the client device and the ad server after the serving plan is received by the client device, the client device can execute the serving plan to display the one or more advertisements on the client device.

In another embodiment, a method for facilitating caching of advertisements is described. The method includes receiving an ad request and generating the serving plan in response to receiving the ad request. The serving plan is generated by the ad server. The serving plan includes multiple cache lines that identify corresponding advertisements. Each of the cache lines is associated with a corresponding expiration. Also, each cache line is readable by logic to display one of the advertisements corresponding to the cache line. The plurality of cache lines includes a first cache line. The first cache line includes ad information, which is associated with a first one of the advertisements. Moreover, the ad information includes one or more parameters for expiration of the first cache line of a client device. The client device is configured to display the plurality of advertisements. The method includes sending the serving plan to the client device to store in the client device.

In one embodiment, a method for facilitating caching of advertisements is described. The method includes determining whether web page data is received. The method further includes generating an ad request is response to determining that the web page data is received. The method also includes sending the ad request and receiving the serving plan in response to sending the ad request. The method includes storing the serving plan within the client device and periodically updating the serving plan based on an ad refresh.

In some embodiments, a system for facilitating caching of advertisements is described. The system includes a client device for executing an application to allow access to web page data. The client device is configured to generate an ad request upon downloading the web page data. The client device includes an ad decision cache (ADC). The system further includes an ad server for receiving the ad request and for generating the serving plan in response to receiving the ad request. The serving plan includes the first cache line. The first cache line includes ad information, which includes one or more parameters for expiration of the first cache line from the ADC.

DESCRIPTION OF EXAMPLE EMBODIMENT(S)

The following example embodiments and their aspects are described and illustrated in conjunction with apparatuses, methods, and systems which are meant to be illustrative examples, not limiting in scope.

Figure 1:
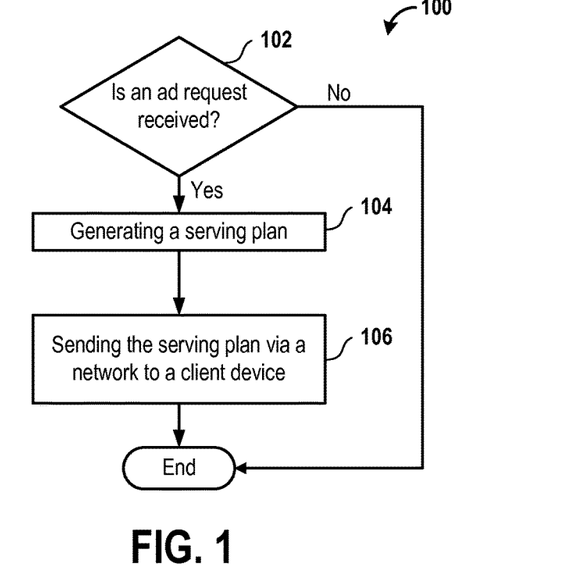
FIG. 1 is a flowchart of a method for generating and sending a serving plan, in accordance with one embodiment of the present invention.

FIG. 1 is an embodiment of a flowchart of a method 100 for generating and sending a serving plan. The method 100 is performed by an ad server, described below with reference to FIG. 3. In operation 102, it is determined whether an ad request is received. In various embodiments, an ad request includes a request for identification of advertisement data and a space identification (ID) categorizing web page data. Examples of categories of web page data include arts, business, computers, arts-movies, and arts-music. In one embodiment, an ad request includes an ad position of embedding the advertisement data within the web page data, a number of ads to be embedded within the web page data, age of content of the web page data, a user ID identifying a user of a client device, and/or type of the content. In some embodiments, the user ID is provided by the user via an input device to log on to the client device. In one embodiment, the user ID is provided by the user via the input device to access an application, which is described below. The input device is also described below. Examples of content types include audio, video, text, graphic, animation, and mixed media.

In some embodiments, the web page data is rendered to display a web page on the client device. In one embodiment, advertisement data includes an ad media package that is associated with an advertisement. For example, advertisement data is rendered to display an advertisement on the client device. An advertisement may be in the form of a graphical ad, such as, a banner ad, a text only ad, an image ad, an audio ad, a video ad, or a combination thereof. An ad media package is described below.

It should be noted that in several embodiments, categorizing and identifying are used interchangeably. For example, web page data is categorized to a level to allow identification of the web page data. As another example, advertisement data is categorized to a level to distinguish the advertisement data from other advertisement data. In such embodiments, a category is subcategorized to additional levels to identify web page data or advertisement data. In one embodiment, an arts category of web page data is further categorized to an arts-music category, the arts-music category is further categorized to an arts-music-artist name category, which is further categorized to arts-music-artist name-album category. The arts-music-artist name-album category is further categorized into arts-music-artist name-album-song category, which identifies web page data or advertisement data.

In some embodiments, content type is used in addition to category type to identify advertisement data or web page data. For example, a song may be in the form of text, animation, video, or audio, or a combination thereof.

In an operation 104, a serving plan is generated in response to reception of an ad request. The serving plan includes one or more cache lines of a collection of cache lines. In one embodiment, the serving plan includes a first cache line associated with a first advertisement and a second cache line associated with a second advertisement. In some embodiments, the first cache line includes a first space ID identifying a web page in which advertisement data, which is rendered to display the first advertisement, is to be embedded; an ad position indicating a position of embedding the advertisement data within the web page; an ad tag categorizing the advertisement data; a maximum number of impressions of the first advertisement; a constraint on the first advertisement; and an expiration time of the first cache line. The first space ID is the same as that received within the ad request. In various embodiments, an expiration time of a cache line is a time of deletion of the cache line from a cache of the client device.

In one embodiment, the first cache line includes a maximum number of impressions of the first advertisement, an expiration time of the first cache line, or a constraint on the first advertisement.

In some embodiments, the ad server avoids sending an ad media package to a processing logic of the client device in response to the ad request. Rather, the ad server sends the serving plan. Such avoidance facilitates to reduce a delay in reception of the ad media package from the ad server. The delay may be a result of a limited amount of network bandwidth between the ad server and the client device. Moreover, any delay in communicating an ad media package is reduced by caching the ad media package in an ad media cache (AMC), described below.

An example of a serving plan is provided as follows:

23456671:column:Chevy:100:freq_cap=5 per hour: 1304626643 (6 hours)
23456671:column:Ford:100:None:1304626643 (6 hours)
23456671:full_page:Darfur:100:freq_cap=2 per hour: 1304626643 (6 hours)
23456671:full_page:HP:100:None:6 hours
33456286:column:Chevy:100:freq_cap=5 per hour: 1304626643 (6 hours)
23456671:column:Chevy:100:freq_cap=5 per hour: 1304626643 (6 hours)
23456671:full_page:Darfur:100:freq_cap=2 per hour: 1304626643 (6 hours)
23456671:full_page:HP:100:None:1304626643 (6 hours).

It should be noted that each cache line in the serving plan has a format of [content category/spaceid]:[ad position]:[ad_tag]:[max_impressions]:[constrain]:[expiration time]. It should further be noted that 'Chevy', 'Ford', 'Darfur', and 'HP' are examples of ad codes received from the ad server. An ad code is an example of an ad tag.

In one embodiment, an expiration time is in an absolute format. In this embodiment, the expiration time is measured from a certain point in time in history. For example, an expiration time is 6 hours from 8 am on Oct. 11, 2011.

In some embodiments, the format of each cache line may be different than that shown. For example, the order of parameters in each cache line is different than that shown in the serving plan example above.

In various embodiments, all expiration times of all cache lines within a serving plan are the same. In other embodiments, an expiration time of a cache line in a serving plan is different than an expiration time of any remaining cache lines in the serving plan.

In some embodiments, an ad position is a center position within a web page, a top left position within the web page, a bottom right position with the web page, a left column position within the web page, a right column position within the web page, a top row position within the web page, or a bottom row position within the web page. In one embodiment, an ad position is a position of an entire web page. In such an embodiment, an advertisement overlays and covers an entire web page. An ad tag may take one or more forms, such as, a numerical form, an alphanumeric form, or an alphabetical form. In one embodiment, an ad tag identifies a version, such as a current version or a subsequent version, of an advertisement. A media vendor, described below, creates a link between an ad tag and an ad media package, which is further described below.

An impression is an instance of an advertisement. In several embodiments, the same advertisement data may be rendered to display several impressions of the same advertisement. A maximum number of impressions within a cache line is a limit on a number of impressions of an advertisement to be displayed. A number of impressions of an advertisement displayed cannot exceed a maximum number of impressions. Once a maximum number of impressions of an advertisement is reached, a client device, which is described below, ceases to display any more impressions of the advertisement.

In one embodiment, a constraint on an advertisement includes a frequency of display of the advertisement on an associated web page. A web page is associated with an advertisement when the advertisement is designated, by a campaign management system, to be displayed on the web page. The campaign management system is described below.

In some embodiments, a cache line is deleted from an ad decision cache (ADC) by the processing logic when an expiration time mentioned in the cache line is reached or a maximum number of impressions mentioned in the cache line is reached. The ADC is described below. A maximum number of impressions is reached when an advertisement is displayed on a display device for the maximum number of times.

In several embodiments, until the expiration time is reached, the processing logic processes the serving plan and avoids sending an ad request to the ad server. In other embodiments, the processing logic periodically checks whether the maximum number of impressions of a cache line or the expiration time of the cache line is reached to determine whether to delete the cache line from the ADC. In some embodiments, a cache line is deleted, by the processing logic, from the ADC regardless of whether an expiration time mentioned in the cache line is reached or a maximum number of impressions mentioned in the cache line is reached. In such embodiments, a storage capacity of the ADC is exceeded. In one embodiment, the ADC has a storage capacity of storing 256 to 512 cache lines.

In various embodiments, the processing logic also counts a number of impressions displayed on the display device and stores the count in a cache line. In various embodiments, the processing logic determines a time at which a latest impression was displayed on the display device and stores the count in a cache line.

It should also be noted that an expiration time of expiration of a cache line and a maximum number of impressions of an advertisement are parameters for expiration of the cache line. The cache line includes the maximum number of impressions.

In various embodiments, the second cache line includes a second space ID of a web page in which additional advertisement data is to be embedded, an ad position of the additional advertisement data, an ad tag categorizing the additional advertisement data, a maximum number of impressions of the second advertisement, a constraint on the second advertisement, and an expiration time of the second cache line from the ADC. In one embodiment, the second cache line includes a maximum number of impressions of the second advertisement, a constraint on the second advertisement, or the expiration time of the second cache line.

The additional advertisement data is associated with the second advertisement. In one embodiment, the additional advertisement data is rendered to display the second advertisement. In one embodiment, the second space ID is associated with the first space ID. For example, the first space ID and the second space ID are associated with web pages having the same category. As another example, the first space ID and the second space ID are associated with web pages having the same content type. As yet another example, the first space ID and the second space ID are associated with web pages having the same category and content type.

In some embodiments, an association between web pages, such as the first and second web pages, is created within an application, such as a digital newsstand application, a digital newspaper application, or a digital magazine application. In one embodiment, the first space ID and the second space ID identify web pages that are received upon execution of the application. The application is downloaded to and executed on the client device to display web pages, which belong to a category, such as, news or investment.

Each of the first and second cache lines is associated with a corresponding expiration parameter. In one embodiment, the first cache line has a first expiration time and the second cache line has a second expiration time. The second expiration time may be the same or different than the first expiration time.

In operation 106, a serving plan is sent, via a network, such as the Internet or the Intranet, to the client device to store in the client device. Method 100 then ends. The method also ends when in operation 102, an ad request is not received.

Figure 2A:
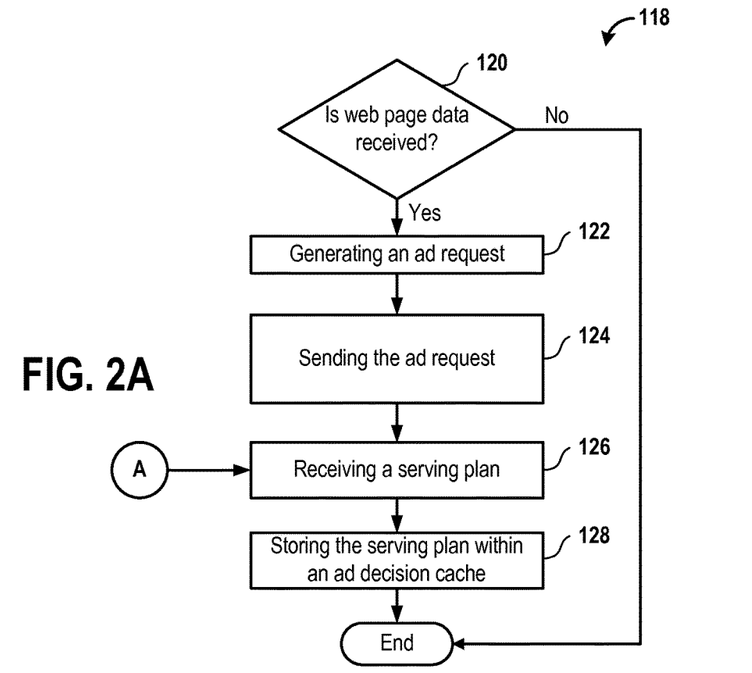
FIG. 2A is a flowchart of a method for generating an ad request and receiving a serving plan in response to the ad request, in accordance with one embodiment of the present invention.

FIG. 2A is a flowchart of an embodiment of a method 118 for generating an ad request and receiving a serving plan in response to the ad request. The method 118 is performed by the processing logic. In operation 120, it is determined whether web page data is received from a web server, which is described below. Web page data may be received in response to sending a uniform resource locator (URL) request for the web page data. A processor of the client device sends the URL request via a network. It should be noted that instead of a processor, a microcontroller, a computer, a central processing unit (CPU), a server, or any other integrated circuit that executes processing logic can be used. The web page data is received via a network. The web page data is identified with a space ID and includes an ad position. Advertisement data is embedded within an ad position.

Upon determining that the web page data is received, an ad request is generated in operation 122. The ad request is then sent in operation 124 to the ad server via a network. In operation 126, a serving plan is received from the ad server via a network. The serving plan is stored in operation 128 within the ADC. The method 118 then ends. In one embodiment, in response to determination of lack of reception of web page data from a web server, the method 118 ends.

Figure 2B:
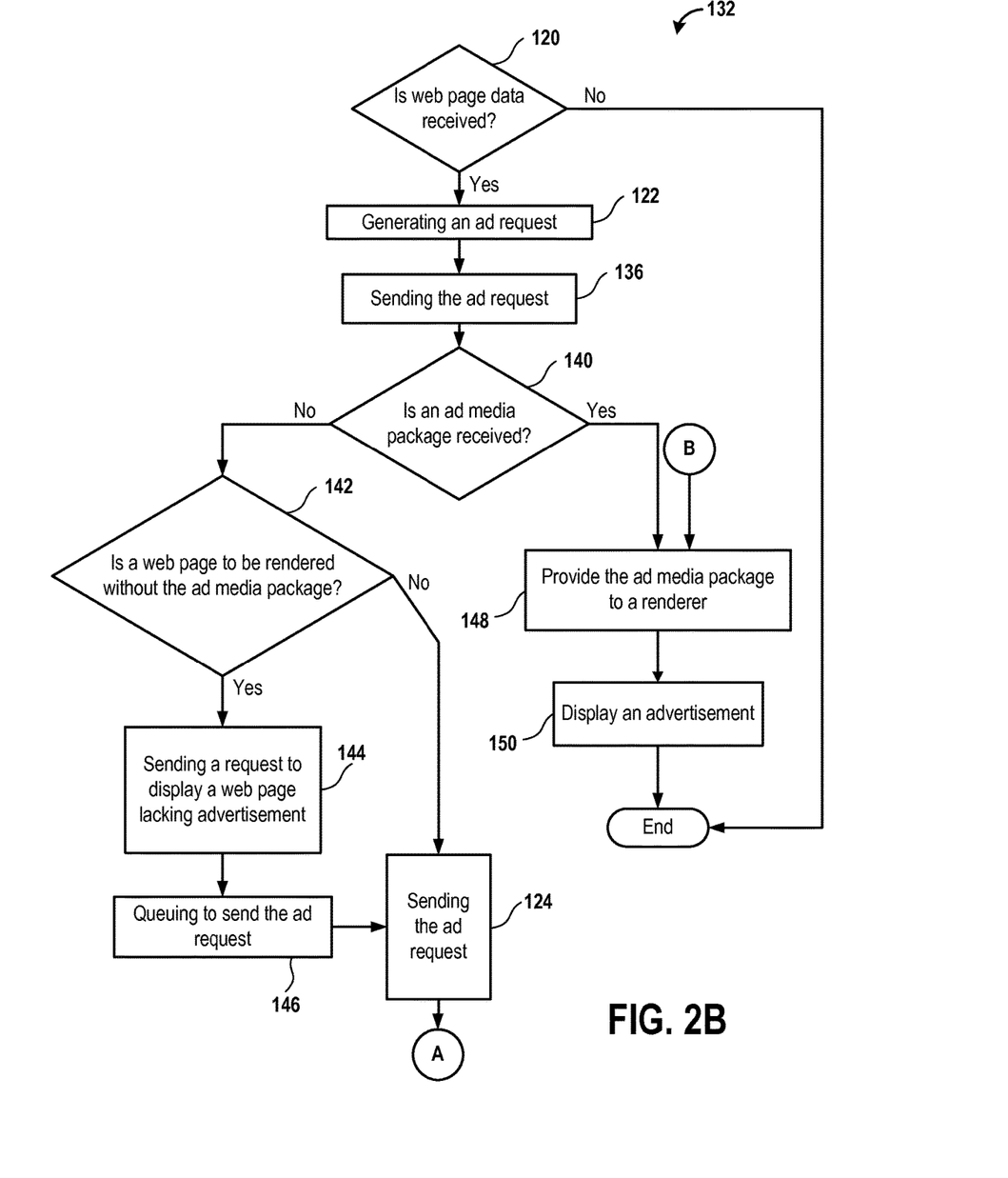
FIG. 2B is a flowchart of a method for generating an ad request and receiving a serving plan in response to the ad request, in accordance with another embodiment of the present invention.

FIG. 2B is a flowchart of another embodiment of a method 132 for generating an ad request and receiving a serving plan in response to the ad request. Operations 120, 122, 124, 136, 140, 142, 144, 146, 148, and 150 of the method 132 are performed by the processing logic. Operations 120 and 122 are described above. Furthermore, in operation 136, an ad request is sent to the ADC.

Upon sending the ad request, in operation 140, the processing logic determines whether a serving plan is received from the ADC in response to sending the ad request. In one embodiment, upon receiving the serving plan, the processing logic determines whether a space ID, sent within the ad request, is present within a cache line of the received serving plan.

If the space ID is present within the cache line, an ad tag of the cache line is sent, by the processing logic, to the AMC of the client device to obtain an ad media package from the AMC. In one embodiment, the ad media package includes content of an advertisement, geometry of the advertisement, texture of the advertisement, and/or color of the advertisement. The ad media package is identified by the ad tag.

The processing logic determines, in operation 140, whether an ad media package is received in response to sending the ad tag. If the ad media package is received from the AMC, the processing logic determines that the ad media package is received. Otherwise, in response to lack of reception of the ad media package from the AMC, the processing logic determines that the ad media package is not received.

Upon determining that the ad media package is received, in operation 148, the processing logic provides the ad media package to a renderer, described below. The renderer renders the ad media package to display an advertisement on the client device. The advertisement is displayed in operation 150. The method 132 then ends.

On the other hand, upon determining that the ad media package is not received, in operation 142, it is determined whether a web page, identified by a space ID within the ad request, is to be rendered without the ad media package. If so, in operation 144, the processing logic sends a request to the renderer to display, on the client device, a web page lacking an advertisement. The advertisement is associated with the ad media package and the web page is identified by the space ID in the ad request that was sent in operation 136.

In operation 146, the processing logic queues the ad request to send the ad request to the ad server and sends, in operation 124, the ad request. The remaining operations 126 and 128, shown in FIG. 2A, are executed in response to sending the ad request to the ad server. It should be noted that in another embodiment, the processing logic determines to avoid queuing to send the ad request and the method 132 ends. In such embodiments, the processing logic avoids performing operations 146, 124, 126, and 128.

In some embodiments, communication is lost or is intermittently lost between the processing logic and the ad server after the serving plan is received by the processing logic. The communication may be lost or intermittently lost as a result of a faulty communication medium between the processing logic and the ad server, the ad server being faulty, or a processor having the processing logic being faulty. A fault may be a malfunction or any other inoperable state. Regardless of whether the communication is lost after the serving plan is received by the processing logic, an ad media package corresponding to the serving plan is obtained and rendered to display an advertisement on the display device.

In various embodiments, an ad media package is deleted from the AMC when a storage capacity of the AMC is reached. The processing logic determines an ad media package from multiple ad media packages to delete based on a variety of factors, such as a time of use of the ad media package, a number of cache lines identifying the ad media package, and/or a size of the ad media package. For example, an ad media package that is used latest is deleted instead of other ad media packages.

Figure 3:
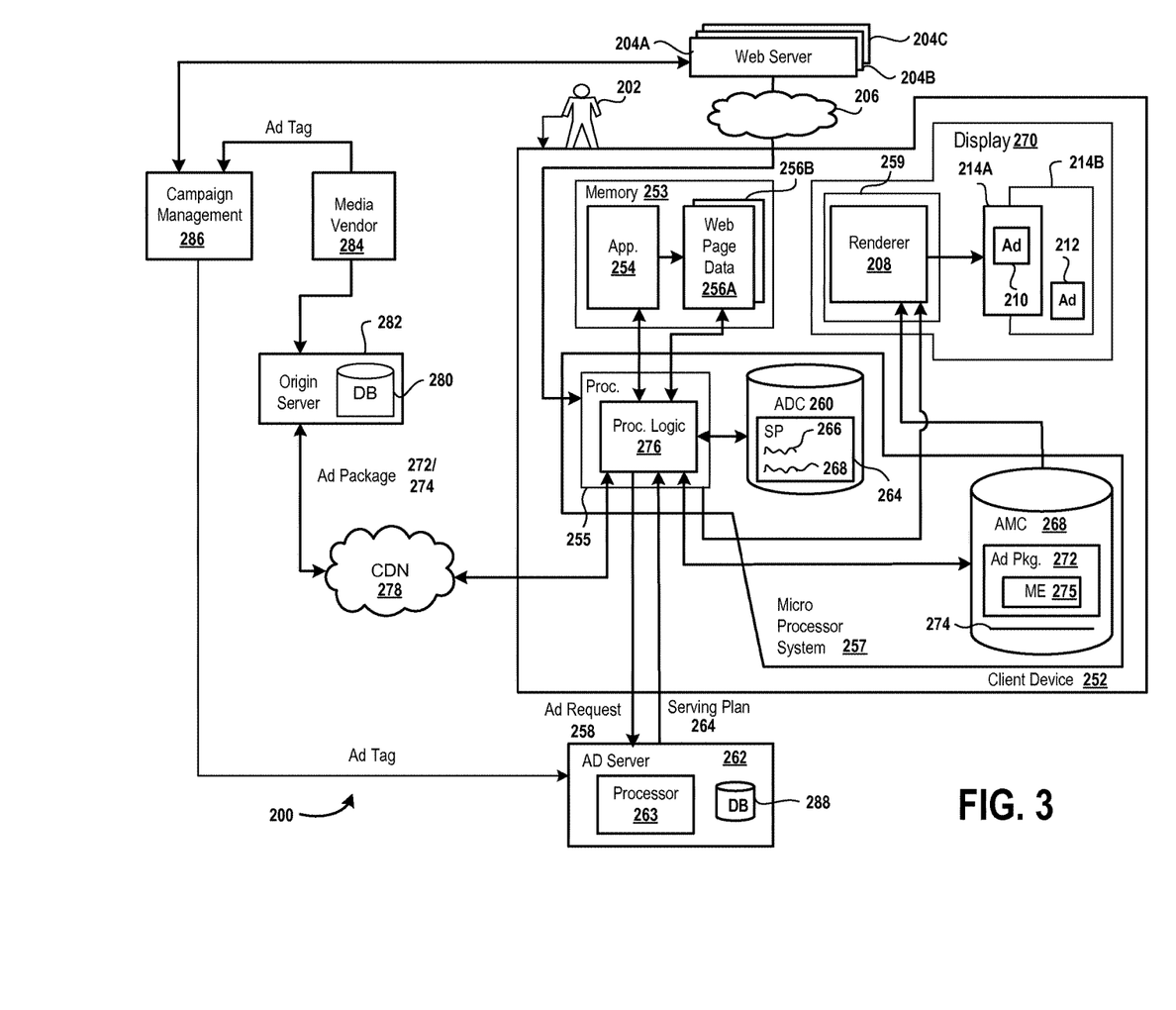
FIG. 3 is a block diagram of a system for facilitating caching of advertisements, in accordance with one embodiment of the present invention.

FIG. 3 is a block diagram of an embodiment of a system 200 for facilitating caching of a serving plan 264. A user 202 performs an action, such as a selection of an icon or writing a script and selecting an 'Enter' button, to execute an application 254, which is stored in a memory device 252. In one embodiment, the memory device 252 is a read-only memory (ROM), a random access memory (RAM), or a combination of ROM and RAM. In some embodiments, the application 254 is a digital newsstand, a digital newspaper, a digital magazine, or a web browser application. Examples of the web browser application include Internet Explorer web browser, Mozilla Firefox web browser, or Netscape Navigator web browser. In one embodiment, the application 254 is downloaded to a client device 252 via a network 206, such as the Internet or Intranet, from a web server 204A.

The application is executed to download web page data 256A and 256B from a web server 204B via the network 206. In one embodiment, the web page data 256 includes web page data describing a newspaper or a magazine. In some embodiments, the web page data 256 includes web page data downloaded from web server 204B as a result of the user 202 selecting a hyperlink of a search result. The search result is generated when the user provides a search query via a search engine, such as a Google search engine or a Yahoo search engine.

The web page data 256A includes an ad position for embedding advertisement data and a space ID of a web page 214A. In one embodiment, the web page 214A is to be displayed on a display device 278 by rendering the web page data 256A. Similarly, the web page data 256B includes an ad position for embedding advertisement data and a space ID of a web page 214B. In one embodiment, the web page 214B is to be displayed on the display device 278 by rendering the web page data 256B. The display device 278, in some embodiments, is a liquid crystal display (LCD), a light emitting diode (LED) display, a plasma display, or a cathode ray tube (CRT) display.

A processing logic 276 of processor 255 determines whether a serving plan 264 associated with the web page data 256 is stored in ADC 260 based on the space IDs of the web pages 214 and the ad positions. In one embodiment, ADC 260 has a storage capacity of the order of kilobytes. In some embodiments, ADC 260 has a storage capacity ranging from 1 kilobyte to 2 kilobyte.

In one embodiment, processor 255, ADC 260, and AMC 268 are parts of a microprocessor system 257. In some embodiments, AMC 268 has a storage capacity of the order of kilobytes or megabytes. In various embodiments, ADC 260 has a storage capacity ranging from 100 kilobytes to megabytes. In one embodiment, the processing logic 276 includes a set of instructions that are executed by processor 255.

The ADC 260 includes the first and second cache lines 266 and 268. The first cache line 266 includes the first space ID and an ad position of the first advertisement and the second cache cline 268 includes the second space ID and an ad position of the second advertisement.

To determine whether the serving plan 264 is associated with the web page data 256, processing logic 276 determines whether the space IDs of the web page data 256 matches the first and second space IDs. If there is a match with the first and second space IDs, there is a cache hit and the processing logic 276 executes the first cache line 266 and if there is a match with the second space ID, there is a cache hit and processing logic 276 executes the second cache line 268.

On the other hand, in one embodiment, in response to determining that the serving plan 264 associated with the web page data 256 is not stored in ADC 260, a cache miss occurs. In such a case, in some embodiments, the processing logic 276 determines to send any ad media package stored in AMC 268 to renderer 208. The renderer 208 renders the ad media package to display an ad on the web page 214A or 214B. In other embodiments, in response to determining that the serving plan 264 associated with the web page data 256 is not stored in ADC 260, the processing logic 276 sends an ad request 258 to an ad server 262.

When the first cache line 266 is executed, the processing logic 276 determines whether an ad media package 272 identified by an ad tag of the first cache line is stored in AMC 268. The ad media package 272 includes media elements 275, such as content of an advertisement, geometry of the advertisement, texture of the advertisement, and/or color of the advertisement. In some embodiments, a media element has a format of a graphics interchange format (gif) file, a video file, or a javascript file.

Upon determining that the ad media package 272 is stored in the AMC 268, a cache hit occurs. On the other hand, upon determining that AMC 268 lacks the ad media package 272, a cache miss occurs and the processing logic 276 requests, via a content delivery network (CDN) 278, the ad media package 272 from a database 280 of an origin server 280. In one embodiment, the CDN 278 is the Internet or an Intranet. Upon reception of the ad media package 272 from origin server 282, the processing logic 276 stores the ad media package 272 in the AMC 268.

When the second cache line 268 is executed, the processing logic 276 determines whether an ad media package 274 identified by an ad tag of the second cache line is stored in the AMC 268. It should be noted that in some embodiments, the ad tags of the first and second cache lines 266 and 268 identify the same ad media package 272.

Upon determining that the ad media package 274 is stored in the AMC 268, a cache hit occurs. On the other hand, upon determining that AMC 268 lacks the ad media package 274, a cache miss occurs and the processing logic 276 requests, via the CDN 278, the ad media package 274 from the database 280. Upon reception of the ad media package 274 from origin server 282, the processing logic 276 stores the ad media package 274 in the AMC 268.

The processing logic 276 provides the ad media package 272 or 274, retrieved from AMC 268, to provide to renderer 208. It should be noted that renderer 208 is executed by a graphical processing unit (GPU) 259 that is a part of display device 270. In some embodiments, the GPU 259 may be located outside the display device 270. Renderer 208 renders media elements 275 of the ad media package 272 to display an advertisement 210 on web page 214A and renderer 208 renders media elements of the ad media package 274 to display an advertisement 212 on web page 214B.

It should be noted that when advertisements 210 and 212 are the same, the media elements of the first and second advertisements 210 and 212 are the same. Otherwise, when ads 210 and 212 are different, one or more of the media elements 275 is different than one or more of media elements of the ad 212. It should further be noted that in some embodiments, both first and second advertisements 210 and 212 may be displayed on the same web page 214A when a space ID of the web page 214A is mentioned in the first and second cache lines, which also include ad tags identifying the first and second advertisements 210 and 212. Also, in one embodiment, advertisement 210 or 212 has an image format, a video format, an animation format, or an audio format.

In case of a cache miss in which serving plan 264 is absent from ADC 260 or ad media package 268 is absent from AMC 268, in several embodiments, processing logic 276 performs one of three operations based on a configuration of the processing logic 276. In a first configuration, the processing logic 276 determines to send web page data 256A to renderer 208 to display the web page 214A that lacks even a single advertisement. In the first configuration, the processing logic 276 avoids sending the ad request 258 to an ad server processor 263 of the ad server 262.

In a second configuration, the processing logic 276 determines to send web page data 256A to renderer 208 and the renderer 208 displays the web pages 214 on display device 270. In this configuration, the web pages 214 lack even a single advertisement. Moreover, in the second configuration, the processing logic 276 queues and sends the ad request 258 to ad server processor 263 after sending the web page data 256A to renderer 208. In the second configuration, the processing logic 276 sends the web page data 256A to renderer 208 without waiting to send the ad request 258 to ad server processor 263. The ad server processor 263 generates the serving plan 264 to send to the processing logic 276. The processing logic 276 receives the serving plan 264 and stores the serving plan 264 in the ADC 260.

In the second configuration, after display of the web page 214A, in case web page data 256A is received again from one of web servers 204 having a space ID and an ad position that match the first space ID and the ad position in the first cache line 266, the web page data 256A and ad package 272 identified by an ad tag of the first cache line 266 are provided by processing logic 276 to renderer 208. The renderer 208 renders the ad package 272 to display the ad 210 on web pages 214A. In the second configuration, if the ad media package 272 is not stored in AMC 268 when serving plan 264 is received from ad server 262, the ad media package 272 is requested, as described above, from origin server 282.

In a third configuration, the processing logic 276 waits to send web page data 256A to renderer 208 before sending the ad request 258 to ad server processor 263. The processing logic 276 first sends the ad request 258 to ad server processor 263. In response to receiving the serving plan 264 based on the ad request 258, the processing logic 276 retrieves the ad media package 272 from AMC 268 and sends the ad media package 272 and the and web page data 256A to renderer 208. The renderer 208 renders the ad media package 272 and the web page data 256A to display the ad 210 on web page 214A. Again, in the third configuration, if the ad media package 272 is not stored in AMC 268 when serving plan 264 is received from ad server 262, the ad media package 272 is requested, as described above, from origin server 282.

A media vendor server 284 is managed by a media vendor entity. In one embodiment, an entity is a person or a company. The media vendor server 284 is used by the media vendor entity to create the ad packages 272 and 274. In one embodiment, the media vendor server 284 is used by the media vendor entity to create an ad that displays a black Ford Taurus adjacent to text, "Best of the Best". In some embodiments, the media vendor server 284 creates the media elements 275 and the media elements of the ad package 274. The media vendor server 284 is used by the media vendor entity to generate an ad tag that identifies the ad media package 272 and another ad tag that identifies the ad media package 274.

The media vendor server 284 sends the ad tags identifying the ad media packages 272 and 274 to a campaign management server 286. The campaign management server 286 is used to associate an ad tag identifying an advertisement with a space ID identifying a web page. In one embodiment, an ad tag is linked with a space ID of a web page based on content of the web page, content of the advertisement, a bid for displaying the advertisement on the web page, and other factors. In some embodiments, a web page is associated with an advertisement to display the advertisement at an ad position on the web page. Various embodiments of a campaign management system are described in U.S. Patent Application Publication No. 2007/0027765, which is incorporated by referenced herein in its entirety. The associations between ad tags, ad positions, and space IDs are provided by campaign management server 286 to ad server 262.

In one embodiment, the application 254 includes associations between multiple web pages. For example, a digital newsstand application includes an association between a first web page of a digital newspaper and a second web page of the digital newspaper so that the second web page is displayed after the first page is displayed on display device 270. As another example, based on a browsing history of user 202, a fourth web page is displayed after a third web page is displayed on display device 270. In this example, the user 202 has a browsing history of frequently downloading the fourth web page from one of web servers 204 after downloading the third web page. In this embodiment, the associations are retrieved from application 254 by campaign management system 286 to provide to ad server 284.

Processor 263 of ad server 262 stores the associations between web pages and associations between space IDs, ad positions, and ad tags in an ad server database 288.

When the ad request 258 is received, ad server 262 generates a serving plan based on the associations between web pages, ad tags, and ad positions and based on the ad request 258. In one embodiment, if the ad request 258 includes the first space ID identifying web page data 256A and an ad position within the web page data 256A, the ad server processor 263 looks up the database 288 to determine an ad tag associated with the first space ID and associated with the ad position. The ad server processor 263 generates a cache line, of the serving plan, having the ad tag and other parameters, such as, the first space ID, the ad position, the ad tag, a maximum number of impressions of an advertisement identified by the ad tag, a constraint on the advertisement, and an expiration time of the first cache line. The ad server 262 sends the serving plan 264 to the processing logic 276.

In some embodiments, when the ad request 258 is received, ad server 262 generates serving plan 264 based on the associations between web pages, based on the ad request 258, and based on the associations between web pages, ad tags, and ad positions. In one embodiment, if the ad request 258 includes the first space ID identifying web page data 256A and an ad position within the web page data 256A, the ad server processor 263 looks up the database 288 to determine an ad tag associated with the first space ID and the ad position. The ad server processor 263 generates the first cache line including the first space ID, the ad position, the ad tag, a maximum number of impressions of advertisement 210 identified by the ad tag, a constraint on the advertisement 210, and an expiration time of the first cache line. Moreover, the ad server processor 263 looks up database 288 to determine whether the first space ID is associated with the second space ID stored in database 288. If so, ad server processor 263 looks up the database 288 to determine an ad tag associated with the second space ID stored in the database 288 and with an ad position, of second advertisement 212, stored in the database 288.

The ad server 262 generates the second cache line including the second space ID, the ad position of second advertisement 212, the ad tag identifying ad media package 274, a maximum number of impressions of the second advertisement 212, a constraint on the second advertisement 212, and an expiration time of the second cache line. The ad server 262 sends the serving plan 264 including the first and second cache lines to processing logic 276.

It should be noted that although the various embodiments, described herein, are described using two cache lines, in some embodiments, any number of cache lines is used. It should also be noted that although some embodiments are described using a single processor or a single server, in various embodiments, multiple servers or processors are used instead. Moreover, although various embodiments are described using two web pages, in other embodiments, any number of web pages can be used.

Figure 4:
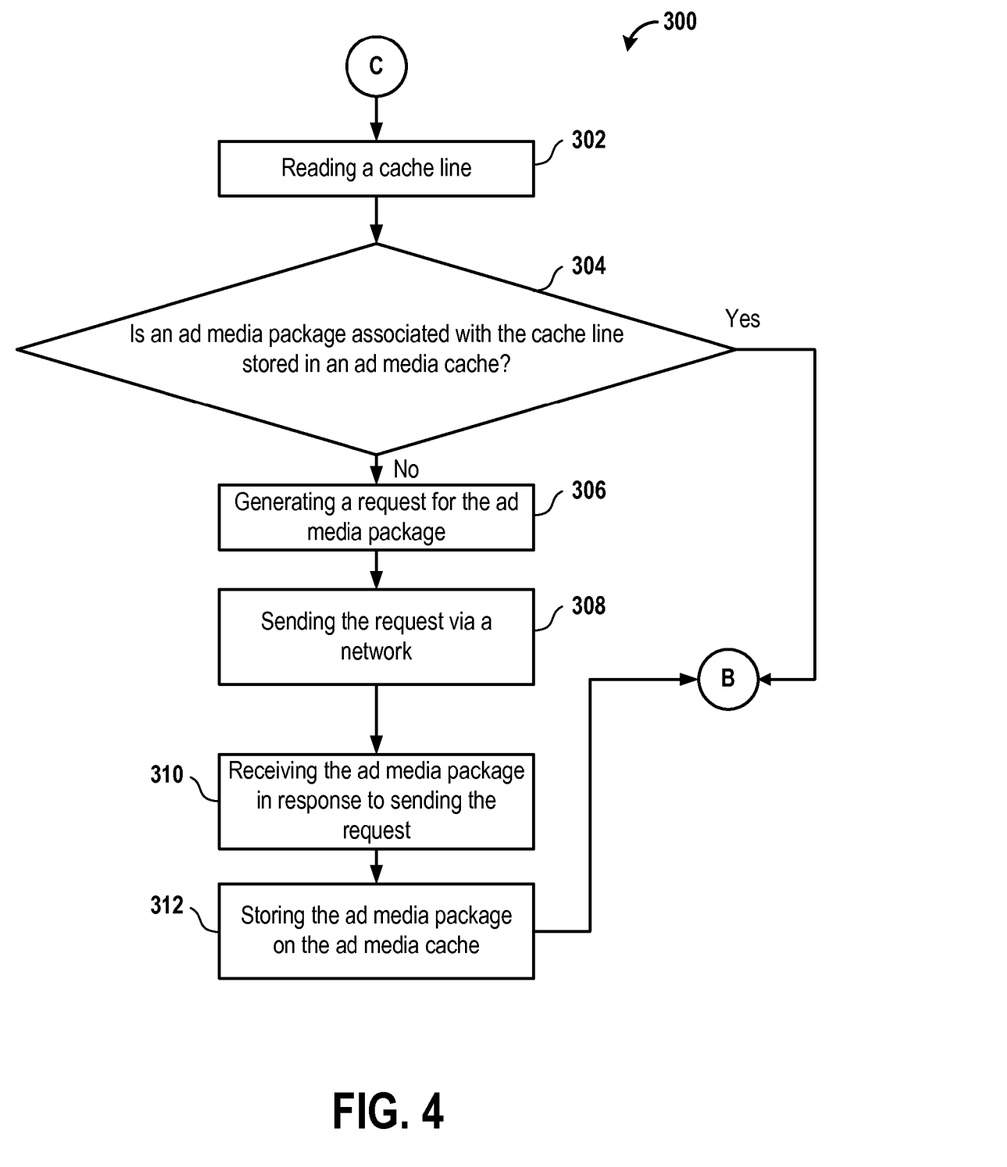
FIG. 4 is a flowchart of a method for determining whether to request an ad media package and for requesting the ad media package, in accordance with one embodiment of the present invention.

FIG. 4 is a flowchart of an embodiment of a method 300 for determining whether to request an ad media package and for requesting the ad media package. Operations 302, 304, 306, 308, 310, and 312 of the method 300 are executed by processing logic 276. In operation 302, a cache line is read from ADC 260. In another operation 304, it is determined whether an ad media package associated with the cache line is stored in AMC 268. In one embodiment, an ad media package is associated with a cache line when the cache line includes an ad tag, which identifies the ad media package. If so, operations 148 and 150, described in FIG. 2B, are performed.

On the other hand, if the ad media package is unassociated with the cache line, a request for the ad media package is generated in operation 306. In operation 308, the request for the ad media package is sent via a network, such as CDN 278, to origin server 282. In response to receiving the request, the ad media package is received from the origin server 282 in operation 310. The ad media package is stored in the AMC 268 to be displayed on display device 270. Operations 148 and 150 of FIG. 2B are then performed.

Figure 5:
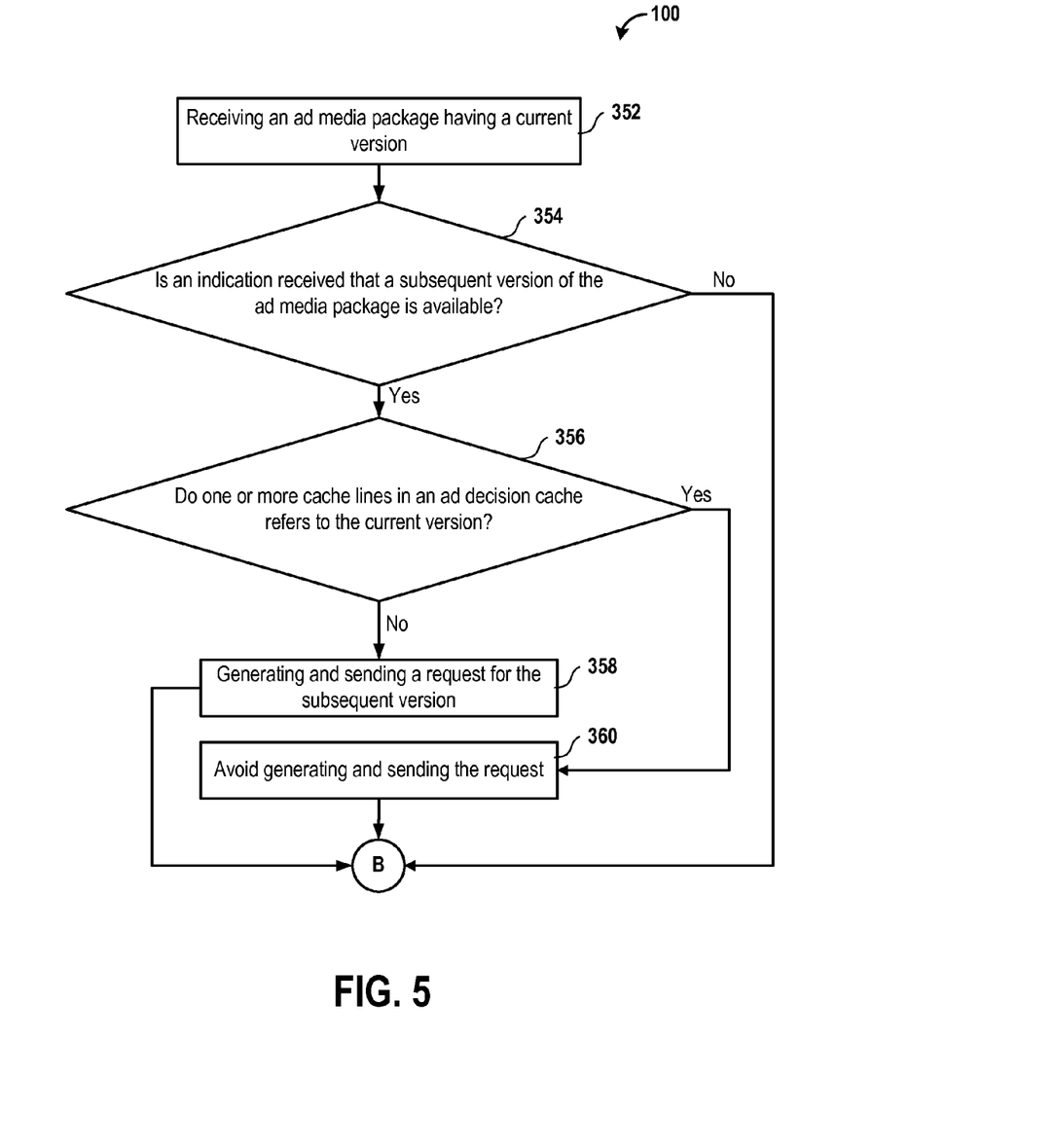
FIG. 5 is a flowchart of a method for determining whether to request a subsequent version of an ad media package and generating the request, in accordance with one embodiment of the present invention.

FIG. 5 is a flowchart of an embodiment of a method 350 for determining whether to request a subsequent version of an ad media package and generating the request. Operations 352, 354, 356, 358, and 360 of the method 350 are performed by the processing logic 276. In operation 352, the processing logic 276 receives an ad media package having a current version from the origin server 282 via CDN 278. The current version is a version developed before the subsequent version. In one embodiment, the current version is version 1.0 of an ad media package and the subsequent version is version 1.1 of the ad media package. In another embodiment, the current version is version 1.0 and the subsequent version is version x.y, where x is an integer greater than zero and y is an integer greater than 0. In the subsequent version, there is a change in one or more media elements compared to the current version. In some embodiments, in the subsequent version, there is a change in one or more but not all media elements compared to the subsequent version. For example, there is a lack of change in geometry between the current and subsequent versions and a change in color between the current and subsequent versions.

In operation 354, the processing logic 276 determines whether an indication that the subsequent version is available is received. In one embodiment, the media vendor server 284 generates the subsequent version and sends the subsequent version to the origin server 282 and to campaign management server 286. The campaign management server 286 replaces an association between a space ID, an ad tag and the current version of an advertisement with an association between the space ID, the ad tag and the subsequent version of the advertisement, also replaces the ad tag identifying the current version with an ad tag identifying the subsequent version, and sends the replaced associations with the space ID and the ad tag identifying the subsequent version to the ad server 262. In response to receiving the subsequent version, the origin server 282 sends an indication to processing logic 276 that the subsequent version is received. In some embodiments, an indication that the subsequent version is generated is sent by ad server 262 to processing logic 276.

In response to receiving the indication, processing logic 276 determines, in operation 356, whether one or more cache lines in ADC 280 refers to the current version. A cache line refers to the current version when the cache line includes an ad tag identifying the current version. If so, in operation 360, the processing logic 276 avoids generating and sending a request to the origin server 282 for obtaining the subsequent version from the origin server 282. In such a case, when the current version is not replaced with the subsequent version, processing logic 276 sends, in operation 148 of FIG. 2B, the current version to renderer 208. In operation 150 of FIG. 2B, the renderer 208 renders the current version to display advertisement 210, having the current version, on web page 214A on display device 270. The web page 214A is associated with the space ID received with the replaced associations.

On the other hand, upon determining that one or more cache lines in the ADC 280 lack reference to the current version, in operation 358, the processing logic 276 generates and sends a request to the origin server 282 via CDN 278 for the subsequent version. In response to sending the request, the subsequent version is received from the origin server 282 via CDN 278. The processing logic 276 replaces the current version in AMC 268. When the current version is replaced with the subsequent version, processing logic 276 sends, in operation 148 of FIG. 2B, the subsequent version to renderer 208. In operation 150 of FIG. 2B, the renderer 208 renders the subsequent version to display an advertisement, having the subsequent version, on display device 270.

Figure 6:
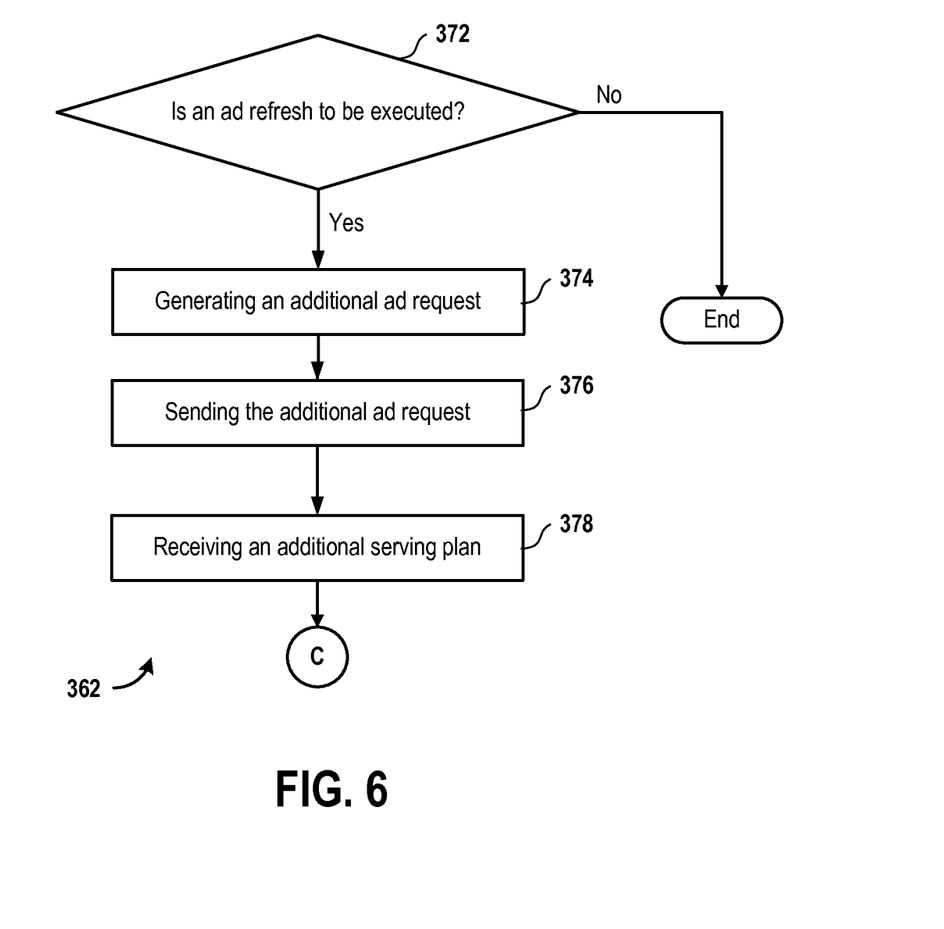
FIG. 6 is a flowchart of a method for executing an ad refresh, in accordance with one embodiment of the present invention.

FIG. 6 is a flowchart of an embodiment of a method 362 for executing an ad refresh. Operations 372, 374, 376 and 378 of the method 362 are performed by the processing logic 276. In operation 372, it is determined whether an ad refresh is to be executed. An ad refresh is to be executed when an indication is received from the user 202 via an input device that the ad refresh is to be executed. In one embodiment, the indication is received when the user 202 selects an "ad refresh" button on display device 270. In another embodiment, the indication is received when the user 202 enters a script on display device 270 that an ad refresh is to be performed. In another embodiment, an ad refresh is to be executed periodically, such as every z time units, where z is an integer greater than zero. Examples of the time units include seconds, minutes, and hours. An example of periodic execution of an ad refresh is an execution every 15 or 20 minutes.

If an ad refresh is not to be executed, the method 352 ends. On the other hand, if an ad refresh is to be executed, an additional ad request is generated in operation 374. The additional ad request includes an ad position for embedding advertisement data into web page data 256A and further includes a space ID identifying the web page data 256A. In operation 376, the additional ad request is sent to ad server 262. Further, in operation 378, an additional serving plan is received in response to the additional ad request.

The additional serving plan is the same or different than serving plan 264, which is received in response to the ad request sent in operation 124 of FIG. 2A. In one embodiment, the additional serving plan includes an ad tag that identifies the new version compared to the serving plan 264, which is associated with the current version. In another embodiment, the additional serving plan includes a different parameter than that included in the serving plan 264. For example, the additional serving plan includes a different number of maximum impressions than that included in the serving plan 264.

Upon receiving the additional serving plan, the serving plan 264 is updated, such as replaced, by the processing logic 276 with the additional serving plan in ADC 260. If the ad refresh is executed periodically, the serving plan 264 is also updated periodically. Moreover, operations 302, 304, 306, 308, 310, 312 of FIG. 4 and operations 148 and 150 of FIG. 2B are repeated with respect to the additional serving plan. In one embodiment, in operation 302, a cache line of the serving additional plan is read. Moreover, in operation 304, it is determined whether an ad media package identified by an ad tag of the cache line of the additional serving plan is stored in AMC 268. If so, the ad media package is sent, in operation 148 to the renderer 208. Renderer 208 renders the ad media package to display an advertisement corresponding to the additional serving plan on web page 214A.

On the other hand, if the ad media package associated with the cache line of the additional serving plan is not stored in the AMC 268, a cache miss occurs and a request for the ad media package is generated in operation 306. The request is sent via the CDN 278 to the origin server 282. The ad media package is received in operation 310 in response to the request and is stored, in operation 312. The ad media package, stored in operation 312, is sent to renderer 208 in operation 148 and the renderer 208 renders, in operation 150, the ad media package to display an advertisement.

In other embodiments, when the ad refresh is to be executed, instead of sending the additional ad request to the ad server 262, the processing logic 276 sends the additional ad request to the ADC 260 to determine whether the ADC 260 includes a serving plan that includes a cache line including a space ID that is provided in the ad request. If so, the processing logic 276 executes the serving plan to retrieve an ad media package identified by an ad tag of the cache line from AMC 260. The ad media package is provided to renderer 208 to render the ad media package on display device 270. On the other hand, in case of a cache miss in which the ad media package is not found within AMC 260 or the serving plan is not found within ADC 260, the processing logic sends the additional ad request to ad server 262.

Figure 7:
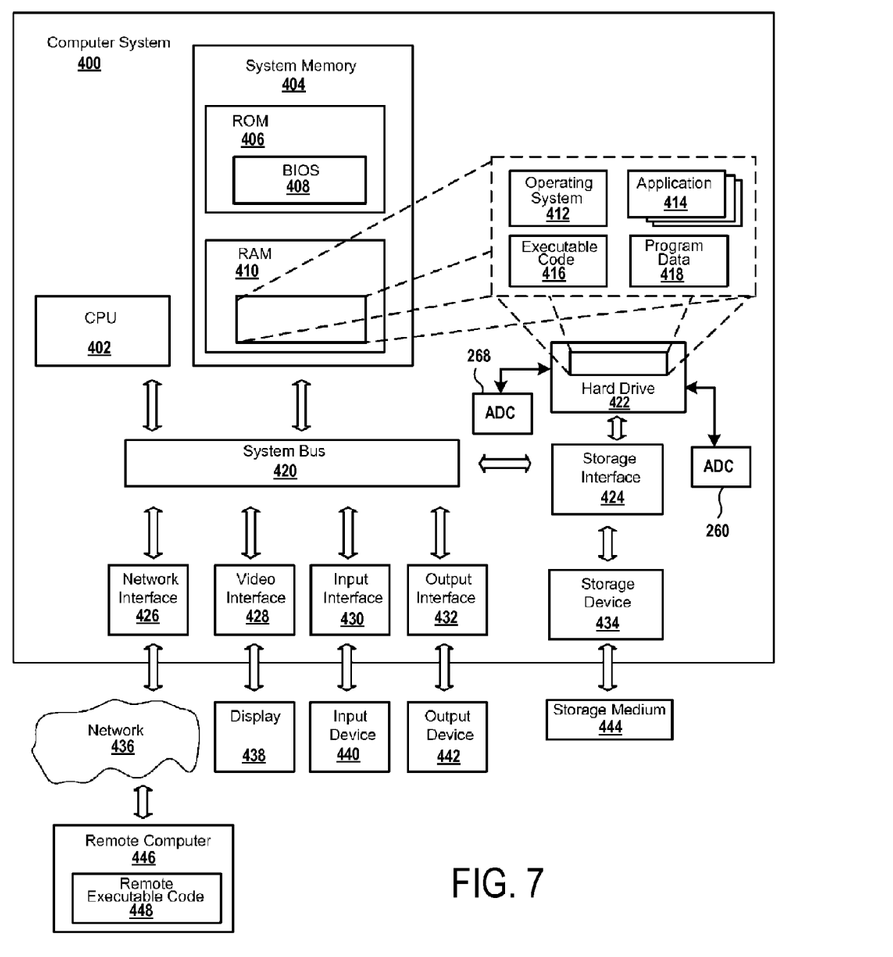
FIG. 7 illustrates suitable components of a computer, in accordance with one embodiment of the present invention.

FIG. 7 illustrates suitable components in an exemplary embodiment of a computer 400. The exemplary embodiment is only one example of suitable components and is not intended to suggest any limitation as to the scope of use or functionality of various embodiments of the present invention. Neither should the configuration of components be interpreted as having any dependency or requirement relating to any one or combination of components illustrated in the exemplary embodiment of computer 400.

Various embodiments of the present invention may be described in the general context of computer-executable instructions, such as processing logic 276, being executed by a CPU 402. Generally, processing logic includes routines, programs, objects, components, and/or data structures, which perform particular tasks. Various embodiments of the present invention may also be practiced in distributed computing environments where tasks are performed by remote processing devices that are linked through a communications network. In a distributed computing environment, processing logic 276 may be located in local and/or remote computer storage media including memory storage devices.

Components of the computer 400 may include, but are not limited to, CPU 402, a system memory 404, and a system bus 420 that couples various system components including the system memory 404 to the processing unit 402. The system bus 420 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 400 may include a variety of computer-readable media. Computer-readable media can be any available media that can be accessed by the computer 400 and includes both volatile and nonvolatile media. For example, computer-readable media may include volatile and nonvolatile computer storage media implemented in any method or technology for storage of information such as computer-readable instructions, data structures, program modules or other data. Computer-readable media includes, but is not limited to, cache, RAM, ROM, flash memory, compact disc ROM (CD-ROM), digital versatile disks (DVD) or other optical disk storage, magnetic cassettes, magnetic tape, magnetic disk storage or other magnetic storage devices, or any other medium which can be used to store the desired information and which can accessed by the computer 400.

The system memory 404 includes computer-readable media in the form of volatile and/or nonvolatile memory such as ROM 406 and RAM 410. An input/output system 408 (BIOS), containing routines that help transfer information between elements within computer 400, such as during start-up, is typically stored in ROM 406. Additionally, RAM 410 may contain operating system 412, application programs 414, other executable code 416 and program data 418. RAM 410 typically contains data and/or processing logic 276 that are immediately accessible to and/or presently being operated on by CPU 402.

The computer 400 may also include other removable/non-removable, volatile/nonvolatile computer-readable media. By way of example only, FIG. 7 illustrates a hard disk drive 422 that reads from or writes to non-removable, nonvolatile magnetic media, and storage device 434 that may be an optical disk drive or a magnetic disk drive that reads from or writes to a removable, a nonvolatile storage medium 444 such as an optical disk or magnetic disk. In some embodiments, a hard disk and/or storage medium 434 includes one or more databases. Other removable/non-removable, volatile/nonvolatile computer storage media that can be used in the exemplary computer 400 include, but are not limited to, magnetic tape cassettes, flash memory cards, digital versatile disks, digital video tape, solid state RAM, solid state ROM, and the like. The hard disk drive 422 is coupled with ADC 260 and AMC 268. It should be noted that although two separate caches are shown in FIG. 7, in some embodiments, ADC 260 and AMC 268 may be part of the same cache, which is partitioned into ADC 260 and AMC 268. In one embodiment, each of ADC 260 and AMC 268 or both AMC 260 and 268 are parts of a database, such as a structured query language (SQL) database, a Datalog database, or a .QL database. It should further be noted that, in one embodiment, CPU 402 is able to retrieve instructions and/or data from a cache faster than from hard drive 424 or from storage medium 444.

The hard disk drive 422 and the storage device 434 may be typically connected to the system bus 420 through an interface such as storage interface 424. In some embodiments, the drives and their associated computer storage media provide storage of computer-readable instructions, executable code, data structures, processing logic 276 and other data for the computer 400. In FIG. 7, for example, hard disk drive 422 is illustrated as storing operating system 412, application programs 414, other executable code 416 and program data 418. The user 202 may enter commands and information into the computer 400 through an input device 440 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 402 through an input interface 430 that is coupled to the system bus 420, but may be connected by other interface and bus structures, such as a parallel port, game port or a universal serial bus (USB). A display device 438 or other type of video device may also be connected to the system bus 420 via an interface, such as a video interface 428. In some embodiments, the display device 438 is an input device. In addition, an output device 442, such as speakers or a printer, may be connected to the system bus 420 through an output interface 432 or the like.

The computer 400 may operate in a networked environment using a network 436 to one or more remote computers, such as a remote computer 446. The remote computer 446 may be a personal computer (PC), a server, a router, a network PC, a peer device or other common network node, and typically includes many or all of the elements described above relative to the computer 400. A network, such as the network 436, may include a local area network (LAN), a wide area network (WAN), or other type of network. Such networking environments are commonplace in offices, enterprise-wide computer networks, intranets and the Internet. In a networked environment, executable code and application programs may be stored in the remote computer 446.

By way of example, and not limitation, FIG. 7 illustrates remote executable code 448 as residing on remote computer 446. It will be appreciated that the network connections shown are exemplary and other means of establishing a communications link between the computers may be used. Those skilled in the art will also appreciate that many of the components of the computer 400 may be implemented within a system-on-a-chip architecture including memory, external interfaces and operating system. System-on-a-chip implementations are common for special purpose client devices, such as hand-held devices. Examples of hand-held devices include mobile phones, tablets, digital music players, personal digital assistants, and the like.

Figure 8:
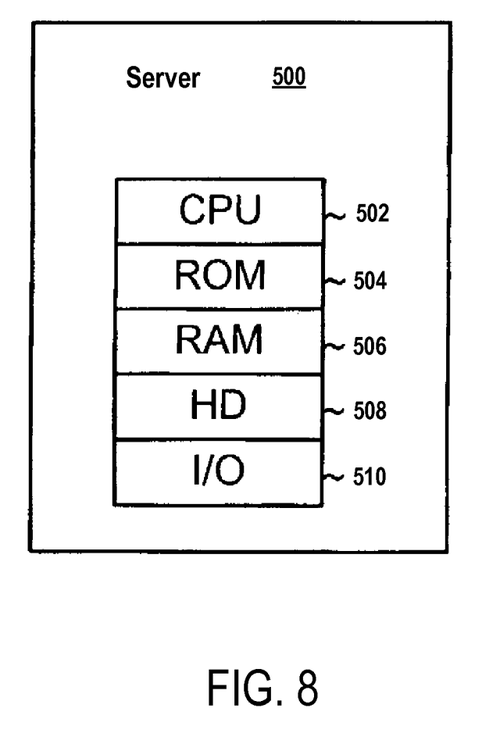
FIG. 8 is a diagram illustrating components of a server, in accordance with one embodiment of the present invention.

Referring to FIG. 8, a diagram illustrating the components of an exemplary server 500 is shown. The server 500 includes a CPU 502, a ROM 504, a RAM 506, a hard disk drive or storage memory 508, and input/output (I/O) interface 510 for coupling input/output devices, such as, a keyboard, monitor, printer, electronic pointing device (e.g., mouse, trackball, stylus, etc.), or the like. In one embodiment, the ROM 504 and/or RAM 506 includes one or more databases. It should be noted that in some embodiments, the server 500 can have more than one CPU, ROM, RAM, HD, I/O, or other hardware components.

It should be noted that although the flowcharts are described with a sequence of operations, in various embodiments, operations in a flowchart are performed in a different sequence than that show or are performed in parallel.

Although various embodiments of the present invention have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method performed by a client device for splitting communication of graphics and serving plans associated with advertisements, comprising:
receiving an ad media package via a computer network;
determining whether web page data is received;
generating an ad request in response to determining that the web page data is received;
sending the ad request to an ad server via the computer network,
wherein said receiving the ad media package via the computer network is performed before said sending the ad request to the ad server, wherein the ad media package includes graphics of a first one of a plurality of advertisements;
receiving a serving plan from the ad server in response to said sending the ad request, wherein the serving plan when received excludes the ad media package, the serving plan including a plurality of cache lines identifying the advertisements, each of the cache lines having a corresponding expiration time of deletion of the cache line from the client device, the plurality of cache lines including a first cache line and a second cache line, the first cache line including ad information, the first cache line readable by logic to display the first advertisement, the second cache line readable by the logic to display a second one of the advertisements, the ad information including an identity of the ad media package for rendering within a web page the graphics of the first advertisement and a number of times for which the first advertisement is to be displayed within the web page, the client device configured to display the advertisements, wherein the web page is rendered from the web page data;
storing the serving plan within the client device, wherein said storing is performed by processing logic of the client device;
periodically updating the serving plan based on an ad refresh;
reading the first cache line to determine whether the ad media package identified by the first cache line is stored in the client device;
rendering the ad media package within the web page for the number of times upon determining that the ad media package identified by the first cache line is stored in the client device.

2. The method of claim 1,
wherein the web page data is associated with a space identification (ID) and includes an ad position, said method further comprising determining whether the ad information associated with the space ID and with the ad position is stored in the client device in response to determining that the web page data is received, wherein said generating an ad request comprises generating the ad request in response to determining that the client device lacks the ad information.

3. The method of claim 1, further comprising:
sending a uniform resource locator (URL) request for the web page data;
receiving the web page data in response to the URL request; and
determining that the web page data is received upon receiving the web page data.

4. The method of claim 1,
wherein said generating the ad request comprises generating a request for an identification of the first advertisement to be displayed.

5. The method of claim 1,
wherein the serving plan includes a plurality of frequencies of display of the advertisements.

6. The method of claim 1, further comprising:
generating a media package request for the ad media package, wherein generating the media package request is performed to send the media package request via the computer network, wherein receiving the ad media package is in response to the media package request for the ad media package; and
storing the ad media package in an ad media cache (AMC) of the client device.

7. The method of claim 6,
wherein the serving plan is sent to be stored in a cache of the client device.

8. The method of claim 1,
wherein the ad media package has a current version, the method further comprising:
receiving an indication that a subsequent version of the ad media package is available;
determining whether one or more of the plurality of cache lines in the client device refers to the current version in response to said receiving an indication;
generating and sending a request for the subsequent version in response to determining that the one or more cache lines lacks reference to the current version; and
avoiding said generating and sending the request in response to determining that the one or more cache lines refers to the current version.

9. The method of claim 1, further comprising:
loosing communication with the ad server, wherein rendering the ad media package to display the first advertisement is performed after the communication is lost.

10. The method of claim 1,
wherein the first cache line includes a first space identification (ID) of the web page data in which the graphics is to be embedded, an ad position indicating a position of embedding the graphics within the web page, an ad tag categorizing the first advertisement, and a constraint on the first advertisement, the constraint including a frequency of display of the first advertisement.

11. The method of claim 1, further comprising:
determining to execute the ad refresh;
generating an additional ad request in response to the determination to execute the ad refresh;
sending the additional ad request; and
receiving an additional serving plan in response to said sending the additional ad request.

12. The method of claim 11, further comprising:
determining whether an ad media package associated with the additional serving plan is stored in an ad media cache (AMC);
determining that a cache miss occurred in response to determining that the ad media package associated with the additional serving plan is not stored in the AMC;
generating an additional media package request to obtain the ad media package associated with the additional serving plan via the computer network; and
receiving the ad media package associated with the additional serving plan via the computer network in response to sending the additional media package request.

13. A system for splitting communication of graphics and serving plans associated with advertisements, comprising:
a client device configured to receive an ad media package via a computer network, the client device configured to execute an application to allow access to web page data of a web page, the client device configured to generate and send an ad request upon downloading the web page data, the client device including an ad decision cache (ADC), wherein the client device is configured to receive the ad media package via the computer network before sending the ad request, wherein the ad media package includes graphics of a first one of a plurality of advertisements; and an ad server for receiving the ad request, the ad server for generating a serving plan in response to receiving the ad request, the serving plan including a plurality of cache lines identifying the advertisements, each of the cache lines having a corresponding expiration time of deletion of the cache line from the ADC, the plurality of cache lines including a first cache line and a second cache line, the first cache line readable by logic to display the first advertisement, the second cache line readable by the logic to display a second one of the advertisements, the first cache line including ad information further including an identity of the ad media package for rendering the graphics of the first advertisement and a number of times for which the first advertisement is to be displayed within the web page, the client device configured to receive the serving plan in response to the ad request, wherein the serving plan received excludes the ad media package, the client device further configured to read the first cache line to determine whether the ad media package identified by the first cache line is stored within the client device, the client device further configured to render the ad media package within the web page for the number of times upon determining that the ad media package identified by the first cache line is stored in the client device.

14. claim The system of claim 13,
wherein the ad request includes a request for the ad information, wherein the ad information further includes a space identification (ID) categorizing the web page data and an ad position of embedding the graphics within the web page data.

15. The system of claim 13,
wherein the client device comprises a display device, the graphics including media elements, the display device configured to apply the media elements to render the first advertisement.

16. A method performed by a server for splitting communication of graphics and serving plans associated with advertisements, comprising:
sending an ad media package to a client device via a computer network;
receiving an ad request from the client device in response to an access to one of a number of webpages, the ad request including data regarding multiple advertisements,
wherein said sending the ad media package to the client device via the computer network is performed before receiving the ad request, wherein the ad media package includes graphics of one of the advertisements; and
sending to the client device a serving plan in response to the ad request, wherein the serving plan when sent excludes the ad media package, the serving plan including a plurality of cache lines including a first cache line and a second cache line, the first cache line including an identity of the ad media package, an expiration time of the first cache line, and a number of times for which the one of the advertisements is to be displayed, wherein the graphics of the one of the advertisements is to be rendered for the number of times, the first cache line associated with a web page identification (ID) of the one of the web pages in which the ad media package is to be rendered, wherein the client device is configured to render the ad media package within the one of the web pages for the number of times.

17. The method of claim 16,
wherein the web page ID is based on a browsing history of a user.

18. The method of claim 16, further comprising:
determining an ad tag associated with the web page ID, the ad tag identifying the one of the advertisements.

19. The method of claim 16,
wherein the second cache line includes a time of expiration of the second cache line.

20. The method of claim 16, further comprising:
receiving an additional ad request, the additional ad request received when a selection of an ad refresh is made using the client device; and
sending an additional serving plan in response to receiving the additional ad request, the additional serving plan associated with different versions of the advertisements than that associated with the serving plan.

* * * * *